UNITED STATES PATENT OFFICE.

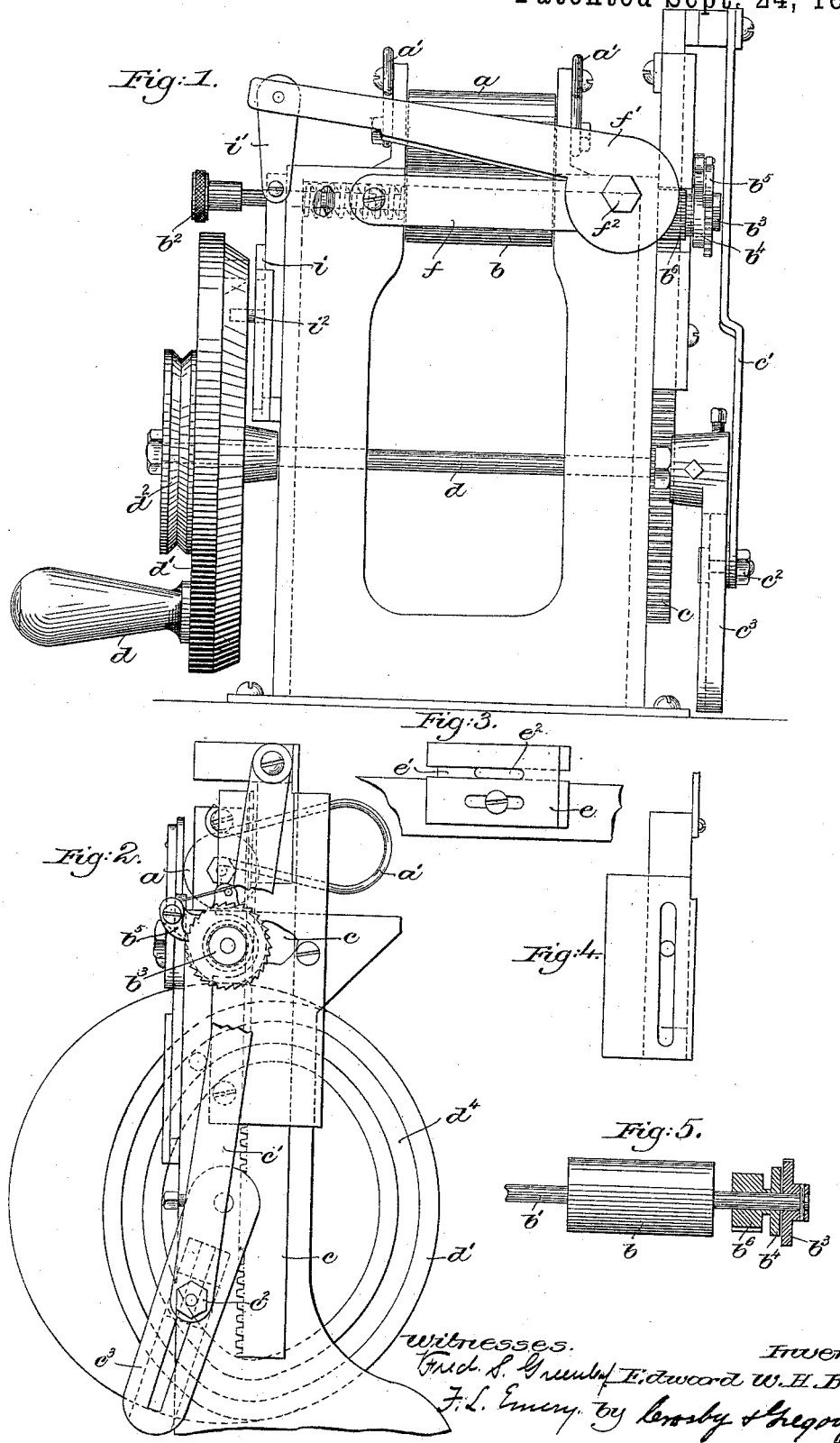

EDWARD W. H. BASS, OF QUINCY, MASSACHUSETTS.

MACHINE FOR CUTTING WEBBING.

SPECIFICATION forming part of Letters Patent No. 411,415, dated September 24, 1889.

Application filed May 4, 1889. Serial No. 309,624. (No model.)

*To all whom it may concern:*

Be it known that I, EDWARD W. H. BASS, of Quincy, county of Norfolk, State of Massachusetts, have invented an Improvement in Machines for Cutting off Webbing, of which the following description, in connection with the accompanying drawings, is a specification, like letters on the drawings representing like parts.

This invention has for its object to construct a machine for cutting webbing or tape into regular lengths to be used as straps or stays for boots and shoes.

In accordance with this invention two cutting-blades are arranged to cut the webbing or tape, preferably by a shear cut, the blades, therefore, being movable one with relation to the other. Means are provided for moving the cutting-blade to cut off a piece of webbing. Suitable feeding mechanism is provided for feeding the webbing forward a definite or regular distance, the said feeding mechanism being so arranged as to remain idle while the piece is being severed and to move the material forward while the cutting blade or blades remain idle.

Figure 1 shows a front elevation of a machine for cutting webbing embodying this invention; Fig. 2, a right-hand side elevation of the machine shown in Fig. 1; Figs. 3, 4, and 5, details to be referred to.

The main frame-work of the machine is of suitable construction to support the operating parts. The feeding-rolls $a$ $b$ are journaled in the main frame-work one above the other, the journals of one of the said rolls, as $a$, running in slots in the frame-work and being acted upon by suitable springs $a'$, by which the roll is held in contact with the roll $b$, or nearly so. One of the rolls, as $b$, is secured to a shaft $b'$, provided at one end with a milled edge cap $b^2$, for rotating it by hand, and at the other end with a ratchet-wheel $b^3$. (See Figs. 1 and 5). A pawl-carrier $b^4$ is mounted loosely on the shaft $b'$, said pawl-carrier carrying a spring-controlled pawl $b^5$, which engages the teeth of the ratchet-wheel $b^3$. A toothed wheel $b^6$ is also loosely mounted on the shaft $b'$ and attached to or formed integral with the pawl-carrier $b^4$ to move simultaneously with it. A rack-bar $c$ is placed in suitable guideways formed on the main frame-work, being arranged in vertical position, and having loosely connected to it at its upper end a connecting-rod $c'$, the lower end of which rod is connected adjustably or in any suitable manner, as with the bolt $c^2$, with a crank-arm $c^3$ rigidly connected with the driving-shaft $d$, mounted in the main frame-work and carrying the driving-wheel $d^2$, having, as herein shown, a grooved hub $d^2$, by which it may be driven by power, and a hand-piece, by which it may be driven by hand.

The operation of the feeding mechanism is as follows: As the driving-wheel is rotated, its shaft $d$ rotates the crank-arm $c^3$, and thereby reciprocates the rack $c$, vertically rotating the toothed wheel $b^6$, which in turn, by means of the pawl, rotates the shaft $b'$, carrying the feed-roll $b$. As herein shown, the reed-roll $b$ will rotate during one half revolution of the driving-wheel and during the other half revolution it will remain idle. The webbing or tape to be severed is fed through a suitable adjustable or other guide, (see Fig. 3,) herein shown as two like plates $e$ $e'$, secured to the frame-work, but arranged in opposite position with relation to each other and formed to present, when assembled or taken collectively, an opening $e^2$ for the webbing. The cutting-blades are herein shown as comprising a stationary blade $f$, and a blade $f'$ loosely connected to it or the main frame-work at $f^2$, to thereby move with relation to the blade $f$ and produce a shear cut. A vertically-reciprocating bar or rod $i$ is arranged in guideways on the main frame-work, it being connected at its upper end loosely by a link $i'$ with the movable blade $f'$. The vertically-reciprocating rod or bar $i$ has a pin $i^2$ projecting outwardly from it, (see Fig. 4,) which follows in a cam groove or guide $d^4$ on the driving-wheel $d'$. By the mechanism thus described and shown, as the drive-wheel revolves the bar $i$ will be reciprocated and the movable blade $f'$ operated to sever the material. It will be seen that the cutting mechanism operates during the time that the feeding mechanism remains idle, and vice versa, thereby moving intermittingly alternately with relation to each other.

I do not desire to limit my invention to any particular construction of cutting-blades or knives.

I claim—

1. In a machine for cutting webbing, the reciprocating cutting-blade, and cam-grooved wheel and connecting mechanism for reciprocating it, combined with the feed-roll $b$, toothed wheel $b^6$, pawl-carrier and pawl, ratchet-wheel $b^3$, rack $c$, connecting-rod $c'$, crank-arm $c^3$, substantially as described.

2. In a machine for cutting off webbing, the movable cutting-blade and means for moving it intermittingly, the feeding devices, and means for moving them intermittingly and alternately with relation to the movements of the cutting-blade, combined with the cap $b^2$, for rotating the driving-roll of the feeding devices independently of the cutting-blade, substantially as described.

3. In a machine for cutting off webbing, the intermittingly-movable cutting-blade and means for moving it, and intermittingly-movable driving-roll for the feeding devices, combined with the toothed wheel $b^6$, pawl-carrier and pawl, the ratchet-wheel $b^3$, rack $c$, connecting-rod $c'$, and crank $c^3$, and drive-shaft $b$, substantially as and for the purposes set forth.

In testimony whereof I have signed my name to this specification in the presence of two subscribing witnesses.

EDWARD W. H. BASS.

Witnesses:
BERNICE J. NOYES,
FREDERICK L. EMERY.